G. T. LEWIS & E. O. BARTLETT
Processes of Making Pigments of White Lead, &c.
No. 221,836. Patented Nov. 18, 1879.
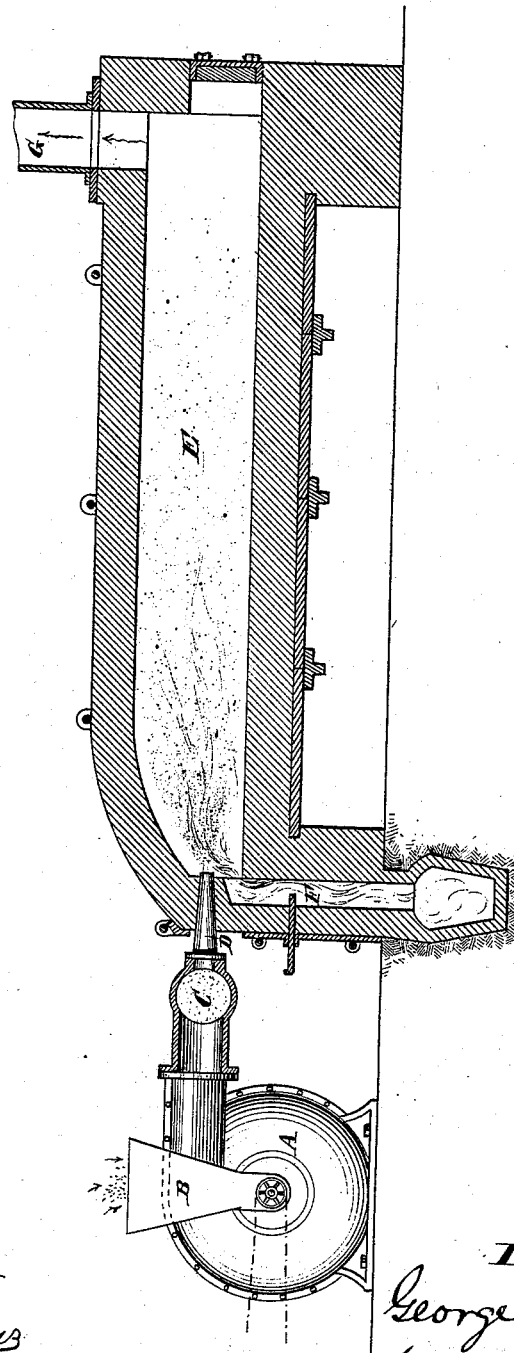

UNITED STATES PATENT OFFICE.

GEORGE T. LEWIS, OF PHILADELPHIA, PENNSYLVANIA, AND EAYRE O. BARTLETT, OF JOPLIN, MISSOURI.

IMPROVEMENT IN PROCESSES OF MAKING PIGMENTS OF WHITE LEAD, &c.

Specification forming part of Letters Patent No. 221,836, dated November 18, 1879; application filed October 25, 1879.

*To all whom it may concern:*

Be it known that we, GEORGE T. LEWIS, of the city of Philadelphia and State of Pennsylvania, and EAYRE O. BARTLETT, of the city of Joplin, State of Missouri, have invented a new and useful process of making white-lead pigment from the waste products of furnaces used for producing lead from galena and other lead-bearing ores, and from waste products from furnaces used in the refining of lead; and we do hereby declare the following to be a specification of the same.

Heretofore we have applied for a patent for the collection of the waste fumes of furnaces used for the reducing of lead from native ores. The escaping products contained in the waste fumes, however, as recovered directly by us, have been unfitted for manufacture into a white pigment, although answering well for certain colored pigments.

We have also discovered that by collecting these waste fumes of the salts of lead in bags or screening-chambers, as heretofore set forth by us in our aforesaid prior application, or by collecting them in flues or by means of water or steam separately or combined, or by catching or collecting them in any way, and then exposing said collected products to the joint action of heat and air to destroy or burn out particles of carbon, sulphuret of lead, or both, by either throwing it on a bright clean anthracite or coke fire with blast from the sides or from below, or by throwing it over such fires or into a cupola-furnace, or by throwing or blowing it into a generator gas-flame or through externally-heated retorts, and then in either case collecting the escaping fumes from the furnace or retort in bags or screening-chambers, white-lead pigment will be obtained which will mix well with oil and produce a superior white paint.

The best process depends upon the kind of fuel in the locality where the fumes are refined, and also upon the purity of the lead-fumes. If they contain iron, clay, &c., it is best to throw them into a coal-fire; but if they are pure the one process is about as effective as the other, and the purity of the fuel decides the kind of heating apparatus to use.

There being such great difference in the purity of fuels, and which irregularity would not allow uniform results, we prefer to use a furnace in which the flame and heat therefrom are produced by burning gaseous fuel with the air which is forced into the furnace with the aforementioned fumes which have been collected in a previous process.

The accompanying drawing shows a furnace which is well adapted to this process in which gas is used as fuel.

A is a blower, into which the fumes are fed from the hopper B. The fumes, being thoroughly mixed with air in the blower, are forced into a chamber, C, and then through a series of tuyeres, D, into a furnace, E. At the same time gas from a generator or producer is admitted by flue F and is burned by the incoming blast from tuyeres D. The volatile fumes produced in the furnace E pass through it and out of the flue G, and are collected in bags or screening-chambers, as before described.

By using gas-fuel it is readily seen to be both easily and fully burned and clean to handle, producing a fine white pigment.

Having thus described our invention, we claim and desire to secure by Letters Patent of the United States—

The hereinbefore-described process for obtaining a white-lead pigment, which consists in collecting the waste fumes of galena or other native ores, from smelting or other lead producing or refining furnaces, reburning said fumes, and collecting the escaping fumes or salts of lead arising from said combustion, substantially as described.

GEORGE T. LEWIS.
EAYRE O. BARTLETT.

Witnesses as to George T. Lewis:
W. C. STRAWBRIDGE,
R. S. CHILD, Jr.

Witnesses as to Eayre O. Bartlett:
B. F. GARRISON,
J. H. MCCOY.